Aug. 26, 1958   J. R. LIKENS   2,849,129
LOAD TRANSFERRING APPARATUS
Original Filed March 31, 1951   3 Sheets-Sheet 1
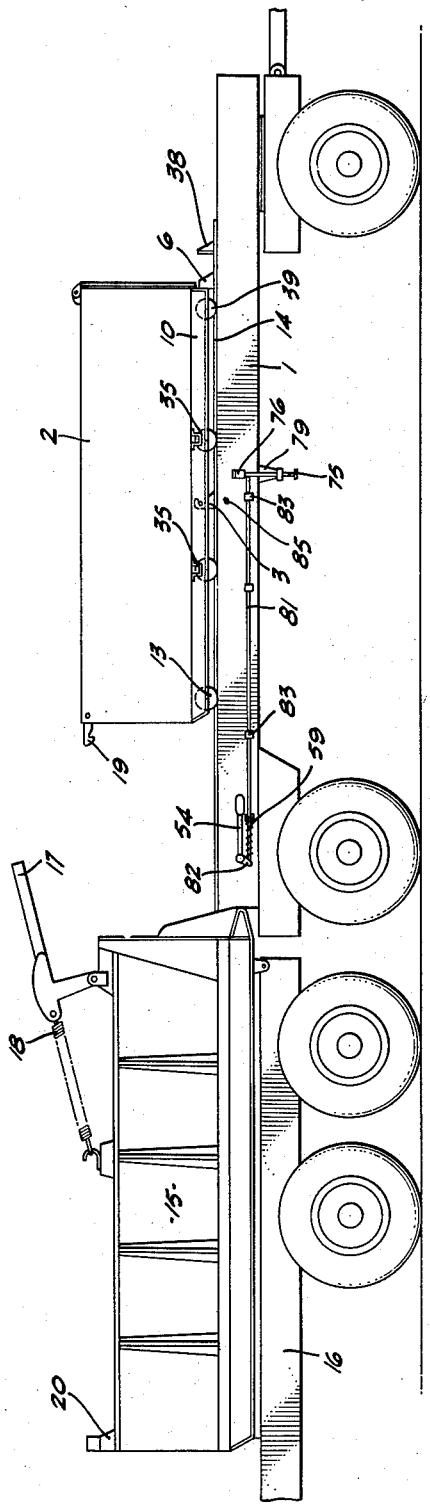
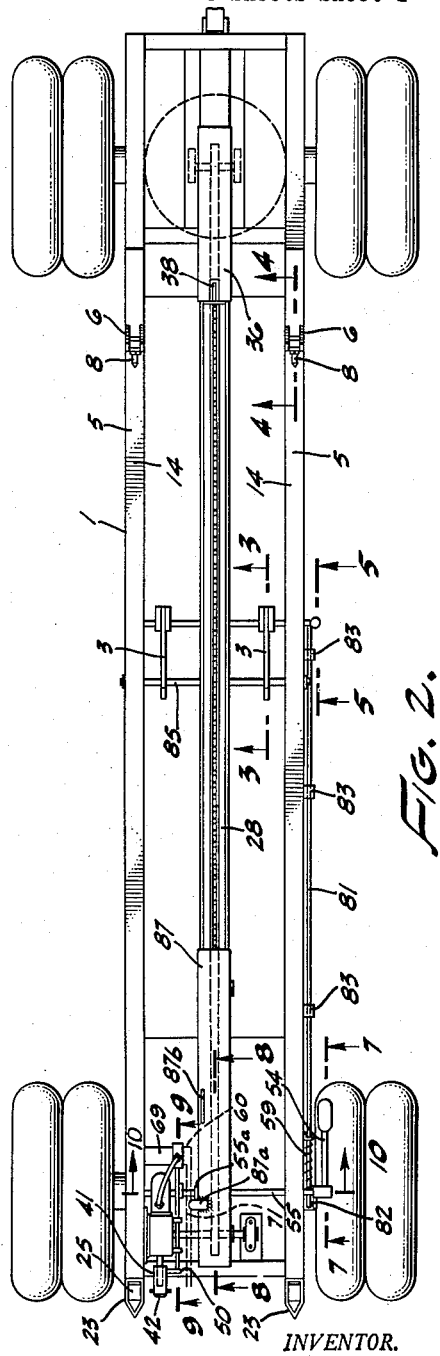
INVENTOR.
JAMES R. LIKENS
BY
ATTORNEY Aug. 26, 1958  J. R. LIKENS  2,849,129
LOAD TRANSFERRING APPARATUS
Original Filed March 31, 1951  3 Sheets-Sheet 2

INVENTOR.
JAMES R. LIKENS
BY
Francis D. Ammen
ATTORNEY

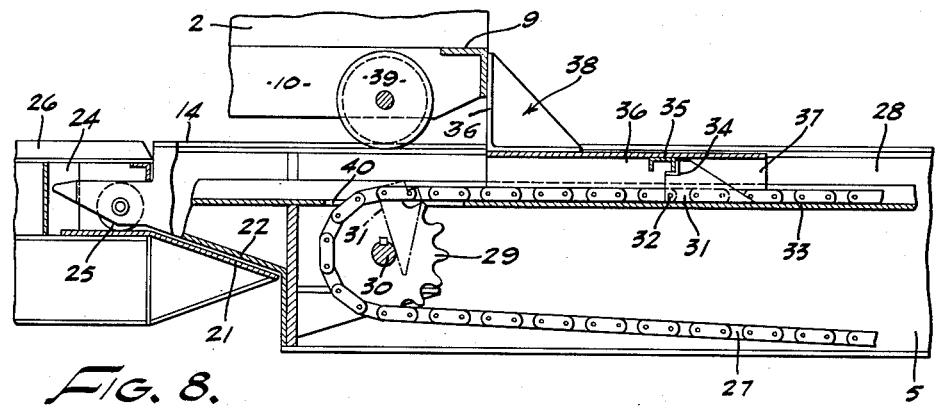

United States Patent Office 2,849,129
Patented Aug. 26, 1958

2,849,129

LOAD TRANSFERRING APPARATUS

James R. Likens, Huntington Park, Calif.

Continuation of application Serial No. 218,604, March 31, 1951. This application December 3, 1956, Serial No. 625,951

12 Claims. (Cl. 214—38)

This invention relates to apparatus for transferring freight or a load from a "pick-up" truck to a second truck aligned with it. This is a continuation of patent application Serial No. 218,604, filed March 31, 1951, now abandoned.

In the following specification the invention is described as applied to a situation where it is necessary to transfer a wheeled load such as a loaded box or shipping case from the end of a pick-up truck or trailer, onto a freight carrying truck, van, or other vehicle.

One of the objects of the invention is to provide mechanism whereby power developed on the truck that receives the load can operate the conveyor that advances the load to it. In order to accomplish this it is necessary to provide the adjacent ends of the two trucks with means co-operating to effect substantially perfect longitudinal alignment of the two trucks when they are brought together for the transferring operation.

A "pick-up" truck such as referred to should be provided with locking mechanism for holding a load such as the freight container or shipping case, against shifting in a fore-and-aft direction. Such locking means is necessary to prevent accidents in case the pick-up truck has to stop suddenly in traffic. Accordingly, one of the objects of the invention is to provide the apparatus with safety features operating to prevent the conveyor mechanism from being operated until after the locking mechanism has been released.

Another object of the invention is to provide simple means for effecting a satisfactory alignment of the adjacent truck ends as they come together and for thereafter establishing a driving connection to the conveyor mechanism from the truck that is receiving the load and also to provide means for preventing the driving connection from being closed if the load locking mechanism referred to above on the pick-up truck has not been released before starting the transferring operation.

Other features of the invention involve the provision of an alternate fluid driven mechanism that can be used for actuating the conveyor of the pick-up truck in case the receiving truck is provided with a fluid pressure system with flexible couplings for connecting up to a hydraulic motor on the pick-up truck. A safety feature is incorporated also with the fluid driven mechanism.

As the pick-up truck may sometimes carry material that might fall into the conveyor and cause trouble, the conveyor is provided with a cover and if this cover is so constructed as to interfere with the operation of the conveyor, I provide means for preventing the starting of the conveyor until the cover is opened or moved so that it cannot obstruct the conveyor's movement.

Further objects of the invention will become evident from a careful reading of the specification and a study of the accompanying drawing.

The invention consists in the novel parts and combination of parts to be described hereinafter, all of which contribute to produce an efficient load transferring apparatus.

A preferred embodiment of the invention is described in the following specification, while the broad scope of the invention is pointed out in the appended claims.

In the drawing:

Figure 1 is a side elevation illustrating a pick-up truck with a load on it locked-up by the locking mechanism and ready (after release) to be advanced onto a second power-driven truck aligned with it, the forward portion of the power-driven truck is shown broken away.

Figure 2 is a plan upon a larger scale of the pick-up truck, omitting the load shown in Figure 1.

Figure 8 is a vertical section on the line 8—8 of Figure 2, on a larger scale particularly illustrating the last stage or position of the conveyor when delivering a load onto the forward truck; and also illustrating means for levelling together the adjacent ends of the two aligned trucks to facilitate passing the load from the pick-up truck.

Figure 9 is a vertical section shown on a larger scale taken substantially on the line 9—9 of Figure 2, and illustrating an alternate fluid-operated mechanism such as hydraulic, or pnuematic, that may be employed for operating the conveyor.

Figure 10 is a vertical section on the line 10—10 of Figure 2 upon a larger scale and particularly illustrating further details of the safety features of the apparatus relating to the movable cover for the conveyor, certain parts being broken away.

Figure 11 is a cross-section on the line 11—11 of Figure 9 upon a larger scale, showing the splining of the coupling for connecting the conveyor of the pick-up truck to the power-driven shaft of the forward truck.

Referring particularly to Figures 1 and 2, 1 indicates the chassis of a pick-up truck which is represented as supporting a load 2 consisting of a freight container or packing "box" that is locked up between locking hooks 3 and a pair of fixed back-stops on the side bars 5 of the chassis.

Figure 4:
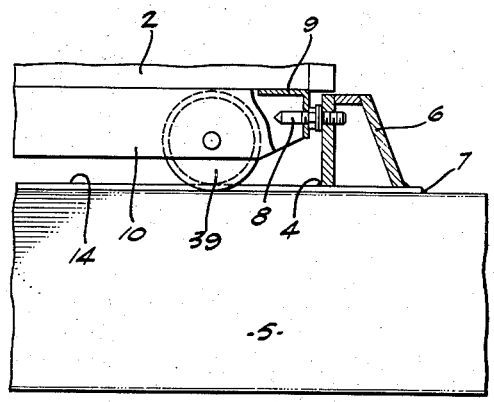
Figure 4 is a fragmentary view, and is a vertical section on the line 4—4 of Figure 2, illustrating the construction at the back stops that cooperate with the locking mechanism to prevent shifting of the load in a front and rear direction on the pick-up truck.
Figure 5:
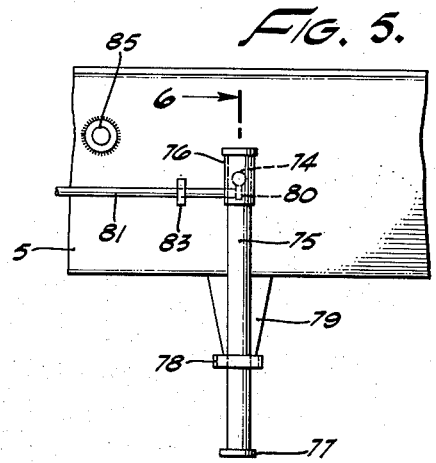
Figure 5 is a fragmentary side elevation, of a portion of the safety mechanism that prevents the conveyor on the pick-up truck from being started while the locking mechanism is in its locking position.

One of these back-stops is illustrated in detail in Figure 4, and comprises a body in the form of a heavy abutment or bracket 6, welded in place as at 4 and 7, and presenting a vertical transverse face from which extends a pintle 8 that projects through an opening in the vertical flange of a transverse angle-iron 9 that forms the rear end of the underbody or carrier 10 on which the freight "box" or load 2 rests.

These pinles hold down the load and the brackets 4 prevent the load from shifting forwardly if the truck chassis 1 stops suddenly in traffic.

The pick-up truck illustrated may be a trailer or any vehicle used for picking up loads and, of course, might be a power driven vehicle.

The locking hooks 3 and the means for operating them are clearly illustrated in Figure 3, and their detail will be described more fully hereinafter. They are formed of heavy plate metal, and when operating, the bill 11 of each hook engages over a cross-bar 12 in the carrier 10 of the load.

The carrier 10 is mounted on grooved wheels 13 that straddle the flat rail or track 14 laid on the upper face of the side channel bars 5 of the chassis.

When the load is about to be advanced into the rear compartment or freight holder 15 on the forward truck 16, a tail-board (not illustrated) is held in a raised position by means of a lever 17, and after the load is inside, a coil spring 18 holds the tail-board in its closed position. Also, when the load 2 is in position within the compartment 15 a hook 19 at its forward end engages a keeper (not illustrated) located in a forward bracket 20.

In order to level up in a vertical plane and align the adjacent ends of the two trucks when the receiving truck 15 is backed into position, the rear end of the truck 16 is provided with an arrangement of camming faces comprising two ramps 21 (see Figure 8) that are inclined to a horizontal plane. When the truck is backed in, these two ramps engage under two inclined seats 22, on the forward end of the rear truck that align with them. When this takes place the ramps and the seats are guided in a horizontal plane into alignment. In order to accomplish this the rear truck is provided with two properly spaced horns 23 (see Figure 2), that pass into position between two inclined plates 24 (see Figure 8) which form a tapered socket disposed at about the same angle as the forward side faces of the horn. This movement is assisted by providing two rollers 25, one in each of the horns. They engage the corresponding ramps 21 as the forward truck backs in. When this backing in movement is completed, the flat rails 14 are located at the same level as the upper edges of rails or tracks 26 that extend forwardly in the receiving truck and which are spaced apart to the same gauge as the rails 14.

An endless chain is employed as a conveyor for advancing the load 2 onto the forward truck, and in the present instance I have illustrated an endless chain 27 mounted on, and confined to the rear truck. To guide it this chain is preferably disposed longitudinally with its upper reach on a chain support 33, the forward end of which is provided with a chain tunnel 28 (see Figure 2). The chain support is here shown located on the front-and-rear central axis of the pick-up truck. The forward end of this endless chain passes over a driving sprocket wheel 29 (see Figure 8), that is keyed on a countershaft 30. This chain 27 carries a plurality of push dog devices comprising essentially dog elements 31 of substantially triangular form, and the lower forward edge of each dog element is pivotally mounted on one of the cross-pins 32 of the chain and the push dog device is therefore fixed in erect position on the chain as it runs along the upper side of the chain support. When these dog elements are running along the chain support 33 their lower edges ride thereon and this holds the dog elements upright so that a notch 34 at the upper edge of any dog element will engage a channel shaped clip 35 on the under side of a pusher or carriage 36 which may be considered as part of the push dog device.

The pusher 36 is in the form of a saddle plate or carriage with side flanges 37 sliding on the side walls of the chain tunnel 28 as the tunnel guides the carriage forward. The pusher 36 has a master dog 38 (see Figure 8) that engages the rear cross-bar 9 of the carrier 10 for the load 2, and as the chain moves, advances the load onto the forward truck 16. It is also indicated in Figure 8 that the pusher 36 at the end of its forward travel will deliver the load completely onto the forward truck, and so that it is clear of the rear truck.

As indicated in Figure 8 when the master dog 38 has pushed the under carriage 10 below the load 2 far enough to move its rear wheels 39 onto the rails 26, the regular dog element 31 on the chain conveyor will have arrived at an opening 40 in the bottom 23 of the chain-tunnel 23, so that the rear end of this dog element will not be supported by the bottom. The dog element will then drop down to the position in which it is shown in dotted lines adjacent to the driving shaft 30. As indicated in Figure 8, the clip 35 is located a sufficient distance to the rear of the forward face of the master dog 38 to assure the above mode of operation, and the arcuate path of travel of the dog element 31 will clear the carrier when on the forward truck.

Referring again to Figure 2, I prefer to provide two alternate means for effecting the driving of the conveyor on the chassis 1. The means in either case involves a source of power on the forward truck which may be the truck engine and a drive element on the rearward truck which may be a motor or gear system of appropriate kind connected to the forward sprocket of the endless chain. A connection is provided on the source of power on the forward truck and on the motor of the rearward truck. An interconnection power transfer means may be carried on the connection on either truck in a position to engage the connection on the other truck whenever the trucks are brought together.

One mechanism which provides the desired drive includes a coupling member 41 that has at its forward end a coupling head 42 adapted to cooperate with a female coupling head 43 (see Figure 9) that is mounted at the rear end of a power driven shaft 44 on the forward truck 16. This shaft 44 should be mounted so as to align with the coupling member 41 when the two trucks are aligned end to end as shown in Figure 1; in other words, these two coupling members 42 and 43 constitute a clutch. Means is provided associated with these coupling heads to effect the closing of a drive from the power-driven shaft 44. While this means could be mounted, if desired, on the forward truck, in accordance with my invention it is preferable to mount it associated with the driven-shaft 45 on which the coupling member 41 is mounted. In order to accomplish this the coupling head 41, as illustrated in Figure 11, is mounted on the shaft 45 through the medium of a spline connection 46; and in order to enable the clutch 42, 43 to be closed, a push-rod 47 is provided guided to slide through brackets 48 on the side of a housing 49, supported on the chassis 1. The forward end of the push-rod 47 is attached to an arm 50 that is carried on a swivel collar 51 mounted on the rear end of coupling member 41. Any suitable cooperating means functioning as the clutch members 42 and 43 may be employed, but in the present instance I have illustrated a conventional one-way driving clutch that includes a driving pin 52, the projecting tips of which engage into two rudimentary bayonet slots 53 in the cup shaped socket that receives the tip of the coupling head 43. The drive, of course, for the present clutch construction would be a clock-wise drive as indicated by the arrow in Figure 9. Reversing the direction of the drive, of course, would open the clutch. This is advantageous as it enables the reverse drive of the motor 65 to free the clutch.

Figure 7:
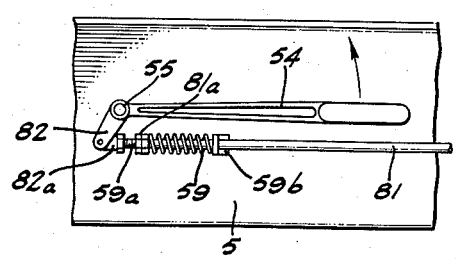
Figure 7 is a fragmentary view of the control lever and contiguous parts illustrated upon a larger scale.

The clutch 42, 43 can be closed manually by a control-lever 54 (see Figures 1 and 2) secured to a spindle 55. Near its inner end this spindle carries an arm 56 having a pin-and-slot connection 57 to a tight sleeve 58 on the push-rod 47. By swinging the control-lever 54 in an anti-clockwise direction the driving connection to the conveyor chain 27 can be closed. The coupling member 41 is normally held in its withdrawn position by a coil spring 59, associated with the control lever 54 (see Figure 7).

The pick-up truck chassis 1 may be provided with its own driving mechanism for driving the conveyor chain 27 by a fluid under pressure furnished by the forward truck. This could be pneumatic or hydraulic operated means using a supply hose 60 (see Figure 9) that connects up to a fluid actuated valve 61 of piston type that is normally held in a closed position shown in Figure 9. The fluid pressure can pass into the end chamber 62 shown at the right of the piston. As the pressure builds up, the piston 61 will move to the left past outlet part 63; that will enable hose connection 64 to deliver operating fluid to a rotary type motor 65, the shaft 66 of which is an extension of shaft 45, and between these two aligned shafts a helical gear, or a worm 67 is mounted that meshes with a driven worm wheel 68 on the shaft 30 already referred to as the driving shaft for driving the conveyor chain.

It only requires about a half-stroke movement of the piston 61 to uncover the outlet part 63, and hence the incidental movement of the coupling member 41 is insufficient to engage it with the coupling member 43. In case these two coupling members did close together, it would merely be necessary to open the clutch (not illustrated) that would be carried on the forward truck for closing its power drive to the shaft 44.

The bracket 69 supports the valve casing 70 for the piston valve 61. The return flow of the operating fluid would be carried by an outlet hose 71. These two hoses 60 and 71 would have suitable coupling members (not illustrated) at their ends for coupling them to air pipes or hose lines leading off from an air compressor on the truck 16 if the operating fluid is air and from a pump if the operating fluid is a liquid.

If it is attempted to close the driving connection to the shaft 45 or to start up the motor 65, before the hooks 3 are moved down (see Figure 1) to release the load 2, the driving of the conveyor will be automatically prevented and such mechanism for effecting the driving will be inhibited.

Figure 3:
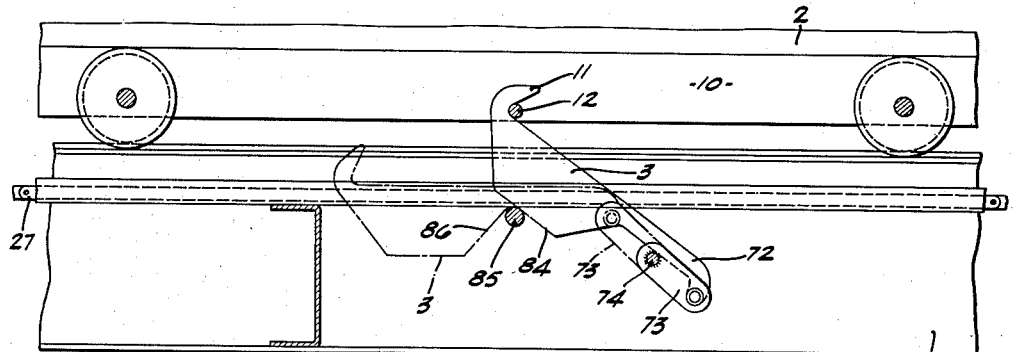
Figure 3 is a vertical section upon a large scale taken about on the line 3—3 of Figure 2, further illustrating details of the locking mechanism.

In order to accomplish this the hooks 3 are formed with handles 72 respectively that are located in line with the upper edge of each hook, and extend normally in a horizontal position, in which position a handle is illustrated in dotted lines in Figure 3. However, when the hooks are in their operative positions each handle 72 extends downwardly in an inclined direction, having been moved to that position by an arm 73 on a spindle 74 that extends out through the side of the chassis 1 (see Figures 1, 2, 5 and 6) where it extends through one of the side bars 5 to the outside at which point it carries an operating lever or handle 75.

Figure 6:
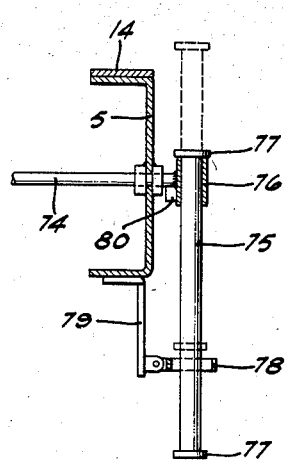
Figure 6 is a vertical section on the line 6—6 of Figure 5 particularly illustrating further details of this safety means for the locking mechanism.

The handle 75 is normally held in a vertical position with its upper end suspended in a sleeve 76 welded to the projecting end of the shaft 74. This handle 75 slides freely through the sleeve and has a head 77 at each end. The upper one suspends it on the sleeve. The lower end of the handle can be permitted to descend through a safety ring 78 as indicated in Figure 6 to prevent any accidental movements of the handle, or its movement by an unauthorized person who probably would not perceive how to operate it. The dotted lines in Figure 6 indicate how the handle can slide upwardly in the sleeve to permit its lower end to be passed down through the locking ring. The locking ring is riveted to a bracket 79 secured to the underside of the frame bar 5.

Under the shaft 74 secured to it and to the adjacent side of the sleeve is a fin 80 and against this fin lies the end of a push rod 81, the other end of which is attached to a short arm 82 of a bell crank lever carried on the end of control spindle 55 and adjacent to the long arm 54. This push rod 81 is guided through eye brackets 83 that are attached to the outer side of the adjacent frame bar 5. In the locking position of the hooks this fin 80 lies in the path of the end of the push rod 81 so as to prevent the push rod from being moved toward the right by the short lever arm 82 if the control lever 54 is swing upwardly in the direction to close the coupling 42, 43 illustrated in Figure 9.

Each hook 3, as stated, is of heavy plate material and preferably has considerable depth from its upper edge to its lower edge 84. This lower edge rides on a fixed cross-bar 85 supported by the side bars 5, and when the hook is in its releasing position which is indicated in dotted outline, the inclined side edge 86 of the plate adjacent the handle 72 lies against the forward side of the cross-bar 85.

When the lever 75 is lifted out of the safety ring 78 and given an anti-clockwise swing, the fin 80 will move out of the path of the end of the push rod 81 and the lever arm 73 will eventually assume the withdrawn position in which it is shown in dotted lines in Figure 3. When this occurs the hook 3 will have moved toward the left by reason of its lower edge 84, dropping over and sliding across the upper left side of cross-bar 85; and in the last part of this movement the inclined edge 86 will slide down on the left side of this cross-bar to the position shown. The fin 80 in this releasing position of the hooks will then permit movement of the rod 81 so that the clutch 42, 43 can be closed.

Referring again to Figure 7 it will be noted that the tension of the spring 59 can be adjusted through the agency of the threaded end 59a of rod 81 connected to a knuckle 82a pivotally attached to the arm 82. There are two check nuts 81a on the thread that can be adjusted toward or away from a fixed bracket 59b through which the rod 81 is guided and which is welded to the outer side face of the adjacent side bar 5 of the chassis.

As a pick-up truck may handle, at times, a material that might find its way into the chain tunnel 28 I prefer to provide the delivery end of the chain, that is, the end near the truck 16, with a movable cover 87 that is attached to the chain tunnel by hinges 88 (see Figure 10). This cover is in the form of a plate-like lid with flanges on its two longitudinal edges.

In accordance with my invention I provide means for preventing the operation of the conveyor unless this cover is raised so as to place it out of the path of the dogs 31 as they move along toward the receiving truck 16. In order to accomplish this I provide the control spindle 55 (see Figure 10) with a rigid upper extending arm 55a. In the normal position of this arm 55a it lies adjacent to a rigid stop finger 87a welded to the adjacent edge of the cover 87 as illustrated in Figure 10. This stop finger 87a lying as it does in the path of the arm 55a prevents any movement of this arm in the direction that it would have to move when the control spindle 55 moves in the direction that would move the coupling member 41 toward the coupling member 43.

To facilitate raising the cover 87 it is provided with an upwardly projecting handle 87b in the form of a fin. By seizing the fin and pulling upwardly the cover 87 can be swung as indicated by the arrow in Figure 10 so that the movement of the dogs 31 will not be obstructed.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A load transfer combination comprising a forward truck, a rearward truck and a longitudinally shiftable wheel-supported carrier initially mounted at a rearmost position on said rearward truck, a pair of carrier-supporting tracks on the forward truck, a pair of correspondingly spaced carrier-supporting tracks on the rearward truck and complementary aligning means respectively on the forward and rearward trucks having both laterally engaging camming faces and vertically engaging camming faces whereby to align said pairs of tracks in both a horizontal and a vertical plane when the trucks are brought together, a chain drive assembly comprising a longitudinal chain support mounted on the rear truck at a location independent of the tracks on said rear truck and extending throughout the length of travel of said carrier, a sprocket mounted on a transverse countershaft on the rearward truck at each end of the chain support and an endless chain extending over said sprockets and slidably supported on said chain support, a push dog fixed in erect position on said chain, temporary dog-engaging elements respectively on said carrier and said chain support engageable during travel of said carrier from the rearward truck to the forward truck, and a motor operably attached to one of said spockets whereby to shift said carrier from the rearward truck to the forward truck.

2. A load transfer combination comprising a forward truck, a rearward truck and a longitudinally shiftable wheel-supported carrier initially mounted at a rearmost position on said rearward truck, a pair of carrier supporting tracks on the forward truck, a pair of correspondingly spaced carrier-supporting tracks on the rearward truck and complementary aligning means respectively on the forward and rearward trucks having both laterally engaging camming faces and vertically engaging camming faces whereby to align said pairs of tracks in both a horizontal and a vertical plane when the trucks are brought together, a chain drive assembly comprising a longitudinal chain support mounted on the rear truck and extending throughout the length of travel of said carrier and at a location spaced from and independent of said tracks on the rear truck, a sprocket mounted on a transverse countershaft on the rearward truck at each end of the chain support and an endless chain extending over said sprockets and slidably supported on said chain support, a push dog unconnected with the carrier and fixed in erect position on said chain during forward movement of the section of the chain to which the dog is fixed, temporary dog-engaging elements respectively on said carrier and said chain support engageable during travel of said carrier from the rearward truck to the forward truck, said dog having an arcuate path of travel adjacent the forward sprocket at a location clearing the dog-engaging element on the carrier only when the carrier is entirely on the forward truck.

3. A load transfer combination comprising a forward truck, a rearward truck and a longitudinally shiftable wheel-supported carrier initially mounted at a rearmost position on said rearward truck, a pair of carrier-supporting tracks on the forward truck, a pair of correspondingly spaced carrier-supporting tracks on the rearward truck and complementary aligning means respectively on the forward and rearward trucks having both laterally engaging camming faces and vertically engaging camming faces whereby to align said pairs of tracks in both a horizontal and a vertical plane when the trucks are brought together, a chain drive assembly comprising a substantially horizontal and longitudinally extending chain support mounted on the rear truck and extending throughout the length of travel of said carrier, a sprocket mounted on a transverse countershaft on the rearward truck at each end of the chain support and an endless chain extending over said sprocket and slidably supported on said chain support, said chain being movable in one selected direction, a push dog fixed in erect position upon and above the chain during forward movement of the section of the chain to which the dog is fixed, temporary dog-engaging elements respectively on said carrier and said chain support engageable during travel of said carrier from the rearward truck to the forward truck whereby to provide a moving resistance for the thrust exerted by said dog against said carrier, a drive element fixed on the rearward truck and operably connected to one of said sprockets, a source of power on the forward truck, connections respectively on the drive element and said source of power, and a power transfer means permanently attached to one of the connections attachable to the other connection when the trucks are brought together and adapted to effect operation of the drive element and movement of said carrier from the rearward truck to the forward truck.

4. A load transfer combination comprising a forward truck, a rearward truck and a longitudinally shiftable wheel-supported carrier initially mounted at a rearmost position on said rearward truck, a pair of carrier-supporting tracks on the forward truck, a pair of correspondingly spaced carrier-supporting tracks on the rearward truck and complementary aligning means respectively on the forward and rearward trucks having both laterally engaging camming faces and vertically engaging camming faces whereby to align said pairs of tracks in both a horizontal and a vertical plane when the trucks are brought together, a chain drive assembly comprising a longitudinal chain support mounted centrally on the rear truck and extending throughout the length of travel of said carrier, a sprocket mounted on a transverse countershaft on the rearward truck at each end of the chain support and an endless chain extending over said sprockets and slidably supported on said chain support, said chain being movable in a selected direction throughout the entire endless path of travel, a push dog device fixed upon and above said chain in erect position during forward movement of the section of the chain to which the dog device is fixed, temporary dog-engaging elements acting respectively between said carrier and said chain support engageable during travel of said carrier from the rearward truck to the forward truck, said dog device having an arcuate path of travel adjacent the forward sprocket at a location clearing the dog-engaging element at the carrier and relieved from a position of engagement against the dog-engaging element at said chain support only when the carrier is entirely on the forward truck, a drive element on the rearward truck and operably connected to one of said sprockets, a source of power on the forward truck, connections respectively on the drive element and said source of power, and a temporarily engageable power transfer means permanently attached to one of said connections at a location within the perimeter of the respective truck and attachable to the other of said connections when the trucks are brought together and adapted to effect movement of said carrier from the rearward truck to the forward truck.

5. In apparatus for transferring a load from one truck to a second truck aligned with the forward end thereof, the combination of a conveyor on the first named truck for advancing the load onto the other truck, a transverse shaft rotatably mounted in the forward end of the first named truck for driving said conveyor, a shaft projecting forwardly from the first named truck including rotary means for driving the said transverse shaft thereby, a coupling member on said forwardly projecting shaft for connecting it up to the driving shaft on the second truck, a fluid operated motor on the first named truck with two hose for connection to a fluid supply, connected thereto for leading the operating fluid to and from the same respectively, one of said hose being a return line to the second truck, for driving said rotary means, thereby enabling alternate operating of the conveyor either through the said forwardly projecting shaft or by pressure developing apparatus for a fluid medium on the second truck.

6. Apparatus for transferring a load according to claim 5, including a gear connection connecting the said forwardly projecting shaft and the said fluid operated motor to the said transverse shaft.

7. Apparatus for transferring a load according to claim 5, including locking means on the first named truck for preventing the load on its from shifting longitudinally when being transported prior to the delivery of the load to the second named truck, and means for inhibiting the driving of the conveyor when the locking mechanism is in its locking position.

8. In apparatus for transferring a load from a rear truck to a forward truck in alignment with it, the combination of releasable means on the rear truck for locking the load against shifting while the load is being transported on the rear truck, a power actuated shaft on the forward truck, a driven shaft on the rear truck lying adjacent to the power driven shaft when the trucks are in said alignment, means on the rear truck for advancing the load onto the forward truck, manually operated means for effecting an operative connection between said shafts to enable the power actuated shaft to move the load onto the forward truck, and means for preventing the effecting of the said operative connection between the shafts before the locking means is released, said releasable means on the rear truck including a pair of hooks and a lever pivotally attached to the same, and a transverse bar supporting the hooks from below, said hooks having a cam edge on the underside thereof coperating with the cross bar to hold the hooks in an elevated operating position in one position of said lever, and depressed in an inactive position in another position of said lever.

9. In apparatus for transferring a load from a rear truck to a forward truck in alignment with it, the combination of releasable means on the rear truck for locking the load against shifting while the load is being transported on the rear truck, a power actuated shaft on the forward truck, a driven shaft on the rear truck lying adjacent to the power driven shaft when the trucks are in said alignment, means on the rear truck for advancing the load onto the forward truck, manually operated means for effecting an operative connection between said shafts to enable the power actuated shaft to move the load onto the forward truck, and means for preventing the effecting of the said operative connection between the shafts before the locking means is released, said releasable means on the rear truck including a pair of hooks and a lever pivotally attached to the same, and a transverse bar supporting the hooks from below, said hooks having a cam edge on the underside thereof cooperating with the cross bar to hold the hooks in an elevated operating position in one position of said lever, and depressed in an inactive position in another position of said lever, and including a transverse rotatable shaft carrying the said lever projecting from the side of the first named truck, and means associated with said transverse shaft and the manually operated means for preventing the operation of the manually operated means when the hooks are in their elevated positions.

10. In a load transferring apparatus to be carried on a rear truck for advancing a load onto a forward truck aligned therewith, the combination of a longitudinally extending endless chain mounted on the rear truck having means for engaging the load to advance the same onto the forward truck, a transverse countershaft at the forward end of the rear truck having means for driving said chain, a driven shaft for driving the countershaft mounted on the rear truck and projecting forward on the rear truck, coupling means associated with the last named shaft for effecting a driving connection to the driven shaft from the forward truck, and driving dogs projecting up from the upper run of the chain for engaging the load to advance it, a movable dirt-excluding cover located over the driving chain in the path of said dogs, and means associated with the cover for preventing the closing of the said coupling means when the cover is in position over the chain.

11. In a load transferring apparatus to be carried on the rear truck for advancing a load onto a forward truck aligned therewith, the combination of a longitudinally extending endless chain mounted on the rear truck having means for engaging the load to advance the same onto the forward truck, a transverse countershaft at the forward end of the rear truck having means for driving said chain, a driven shaft for driving the countershaft mounted on the rear truck and projecting forward on the rear truck, coupling means associated with the last named shaft for effecting a driving connection to the driven shaft from the forward truck, and in which the said driving means for the load includes driving dogs projecting from the upper run of the chain for engaging the load to advance it, a movable dirt-excluding cover located over the driving chain and lying in the path of said dogs, a control spindle on the rear truck for closing the coupling means and having a moving part lying adjacent the said cover, said cover having a stop lying in the path of said moving part when the cover is in its closed position to prevent the spindle from closing the coupling means.

12. In apparatus for shifting a wheeled load container from a rear truck to a forward truck, the combination of track rails fixedly attached to the chassis of the rear truck, track rails attached fixedly to the chassis of the forward truck, said wheeled load container adapted to move along said rails of the rear truck onto the forward truck's rails, correlated aligning means on the rear end of the forward truck and on the forward end of the rear truck aligned with each other longitudinally with respect to the axes of the trucks, brought into engagement with each other when contact of the trucks is effected when their axes are in longitudinal alignment, said aligning means operating to bring the rails of the two trucks to the same level and align them with each other in a horizontal plane, an endless chain mounted on, and confined to, the rear truck and extending longitudinally on the same, means carried by the said endless chain for pushing the wheeled load container forward to roll it off the rear truck and completely onto the rails of the forward truck and clear of the rear truck, a transverse countershaft at the forward end of the rear truck with a sprocket wheel thereon carrying the forward end of the endless chain, and a motor on the forward end of the rear truck with means for driving the said countershaft from said motor, said pusher means comprising a dog carried by the chain, a pusher carriage guided to slide forward on the rear truck, with a master dog on the carriage for engaging the rear end of the load, and a clip on the carriage in the path of the first named dog located sufficiently to the rear of the driving face of the master dog to insure that the load will pass completely onto the forward truck's rails.

References Cited in the file of this patent

UNITED STATES PATENTS

| | | |
|---|---|---|
| 778,613 | Ward | Dec. 27, 1904 |
| 1,132,960 | Moreland | Mar. 23, 1915 |
| 1,680,179 | Shelley | Aug. 7, 1928 |
| 2,045,566 | Berg | June 30, 1936 |